(12) United States Patent
Kamata et al.

(10) Patent No.: US 11,926,741 B2
(45) Date of Patent: Mar. 12, 2024

(54) METHOD FOR PRODUCING QUINACRIDONE SOLID-SOLUTION PIGMENT, PIGMENT DISPERSION, AND INK-JET INK

(71) Applicant: DAINICHISEIKA COLOR & CHEMICALS MFG. CO., LTD., Tokyo (JP)

(72) Inventors: Naoto Kamata, Tokyo (JP); Sachio Yoshikawa, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 774 days.

(21) Appl. No.: 16/976,169

(22) PCT Filed: Mar. 30, 2018

(86) PCT No.: PCT/JP2018/013788
§ 371 (c)(1),
(2) Date: Aug. 27, 2020

(87) PCT Pub. No.: WO2019/187058
PCT Pub. Date: Oct. 3, 2019

(65) Prior Publication Data
US 2020/0407563 A1 Dec. 31, 2020

(51) Int. Cl.
*C09B 67/14* (2006.01)
*C09B 48/00* (2006.01)
*C09B 67/20* (2006.01)
*C09D 11/322* (2014.01)

(52) U.S. Cl.
CPC .......... *C09B 67/0017* (2013.01); *C09B 48/00* (2013.01); *C09B 67/0066* (2013.01); *C09D 11/322* (2013.01)

(58) Field of Classification Search
CPC ............... C09B 67/0017; C09B 48/00; C09B 67/0066; C09B 67/0027; C09B 67/0092; C09B 67/0036; C09D 11/322; C09D 17/00
See application file for complete search history.

(56) References Cited

U.S. PATENT DOCUMENTS

| | | | |
|---|---|---|---|
| 4,455,173 A | 6/1984 | Jaffe | |
| 4,895,949 A | 1/1990 | Jaffe et al. | |
| 5,318,626 A | 6/1994 | Maki et al. | |
| 5,972,099 A | 10/1999 | Badejo et al. | |
| 5,989,333 A * | 11/1999 | Urban ............... | C09B 67/0036 106/31.77 |
| 6,251,553 B1 | 6/2001 | Baur et al. | |
| 6,312,512 B1 | 11/2001 | Urban et al. | |
| 2013/0050364 A1* | 2/2013 | Imamura ............ | C09D 11/40 347/100 |
| 2020/0062965 A1* | 2/2020 | Kamata ............... | C09D 7/65 |

FOREIGN PATENT DOCUMENTS

| | | |
|---|---|---|
| CN | 1210123 | 3/1999 |
| EP | 0348347 | 12/1989 |
| EP | 0896034 | 2/1999 |
| JP | 58-023858 | 2/1983 |
| JP | 60-035055 | 2/1985 |
| JP | 05-125292 | 5/1993 |
| JP | 10-030062 | 2/1998 |
| JP | 10-219166 | 8/1998 |
| JP | 11-049998 | 2/1999 |
| JP | 11-100521 | 4/1999 |
| JP | 11-246786 | 9/1999 |
| JP | 2000-169745 | 6/2000 |
| JP | 2000-281930 | 10/2000 |
| JP | 2000-319534 | 11/2000 |

(Continued)

OTHER PUBLICATIONS

European Partial Search Report, issued in European application No. 18912892.9, dated Dec. 2, 2021, 14 pages (EP 1004941, EP 0896034 and EP 3533842 have been cited before as the US corresponding publications of the family applications in the previously filed IDSs.).
Australian Office Action, issued in the corresponding Australian patent application No. 2018416405, dated Dec. 1, 2020, 4 pages (all references cited previously).
International Preliminary Report on Patentability, issued in the corresponding PCT application No. PCT/JP2018/013788, dated Oct. 6, 2020, 7 pages.
International Search Report, issued in the corresponding PCT application No. PCT/JP2018/013788, dated Jun. 5, 2018, 5 pages (including translation).
International Search Report, issued in the corresponding PCT application No. PCT/JP2017/036614, dated Nov. 14, 2017, 6 pages.
Australian Examination Report, issued in the corresponding Australian patent application No. 2017350235, dated Oct. 14, 2019, 4 pages.

(Continued)

*Primary Examiner* — Jennifer A Smith
*Assistant Examiner* — Jeffrey Eugene Barzach
(74) *Attorney, Agent, or Firm* — Hamre, Schumann, Mueller & Larson, P.C.

(57) ABSTRACT

A quinacridone solid solution pigment that allows a colored product to have high chroma and a properly yellowish hue and has a controlled particle diameter, and a method for producing the quinacridone solid solution pigment. In the method, a water-containing crude quinacridone solid solution is produced by a co-cyclization reaction of a diarylaminoterepththalic acid and a dialkylarylaminoterephthalic acid in polyphosphoric acid, then the resulting water-containing crude quinacridone solid solution having a mass ratio of unsubstituted quinacridone to a 2,9-dialkylquinacridone of 85:15 to 60:40 is dried, thereby obtaining a powdery, crude quinacridone solid solution having a water content of less than 1%. Then, the resulting powdery, crude quinacridone solid solution is heated in a liquid medium that does not dissolve the crude quinacridone solid solution. Also, a pigment dispersion liquid and an inkjet ink each containing the obtained quinacridone solid solution pigment are provided.

2 Claims, No Drawings

(56) References Cited

FOREIGN PATENT DOCUMENTS

| JP | 2002-146224 | 5/2002 |
|----|-------------|--------|
| JP | 2005-255880 | 9/2005 |
| JP | 2006-096927 | 4/2006 |
| JP | 2007-119774 | 5/2007 |
| WO | 2005/014728 | 2/2005 |
| WO | 2018/079239 | 5/2018 |

OTHER PUBLICATIONS

Japanese Office Action issued in the corresponding Japanese patent application No. 2018-547530, dated Dec. 3, 2019, 6 pages (including translation).

Chinese Office Action issued in the corresponding Chinese patent application No. 201780066181.X, dated Mar. 2, 2020, 14 pages (including translation).

Extended European Search report, issued in the corresponding European patent application No. 17864504.0, dated Jun. 12, 2020, 7 pages.

First Canadian Office Action, issued in the corresponding Canadian patent application No. 3041601, dated Jun. 16, 2020, 4 pages.

Korean Office Action, issued in the corresponding Korean patent application No. 10-2019-7014794, dated Aug. 21, 2020, 9 pages (including translation).

* cited by examiner

METHOD FOR PRODUCING QUINACRIDONE SOLID-SOLUTION PIGMENT, PIGMENT DISPERSION, AND INK-JET INK

TECHNICAL FIELD

The present invention relates to: a method for producing a quinacridone solid solution pigment; a pigment dispersion liquid; and an inkjet ink. In detail, the present invention relates to a technique for providing: a method for producing a quinacridone solid solution pigment, the method making it possible to obtain a quinacridone solid solution pigment that allows a resultant colored product to have high chroma and a desired, properly yellowish hue when the quinacridone solid solution pigment is applied to a colorant, and, further, making it possible to obtain a quinacridone solid solution pigment that is suitable for an inkjet ink, the quinacridone solid solution pigment having a controlled particle diameter; and a pigment dispersion liquid and an inkjet ink each containing a quinacridone solid solution pigment that can be obtained by the production method, the quinacridone solid solution pigment having a characteristic hue.

BACKGROUND ART

It is known that quinacridone is a high-performance synthetic pigment having a vivid color and weatherability and typically exhibits red to purple and that the hue is influenced by a substituent on the conjugated ring and by the crystal structure. A lot of studies on a quinacridone solid solution pigment, which is in a field of quinacridone-based pigments, have been conducted in an organic pigment field. For example, a quinacridone pigment composed of a solid solution of unsubstituted quinacridone and 2,9-dimethylquinacridone, C.I. Pigment Red 206 which is a quinacridone pigment composed of a solid solution of unsubstituted quinacridone and a quinacridone quinone, C.I. Pigment Red 207 which is a quinacridone pigment composed of a solid solution of unsubstituted quinacridone and 4,11-dichloroquinacridone, etc. are known (see Patent Literatures 1 and 2).

CITATION LIST

Patent Literature

Patent Literature 1: Japanese Patent Laid-Open No. 2000-281930

Patent Literature 2: Japanese Patent Laid-Open No. 2002-146224

SUMMARY OF INVENTION

Technical Problem

However, there has been a problem that the chroma of a colored product which is obtained from a conventional quinacridone solid solution pigment is still insufficient. In addition, a quinacridone solid solution having a yellowish hue has been desired in the market in recent years, but a quinacridone solid solution which can fully satisfy this need in the market, the quinacridone solid solution having high chroma and a desired, properly yellowish hue, has not been able to be provided yet. In addition, for example, a pigment which is used as a colorant for an inkjet ink is required to be fine and have uniformly controlled particle diameters; however, there is a problem that it is difficult to control the size of the diameter of fine particles uniformly in a solid solution pigment.

Accordingly, an object of the present invention is to provide a technique that can produce a quinacridone solid solution pigment with which a colored product having high chroma and a desired, properly yellowish hue is formed when the quinacridone solid solution pigment is applied to a colorant, and more suitably, that can also produce a quinacridone solid solution pigment having a controlled particle diameter and having a desired particle diameter. In addition, another object of the present invention is to provide a pigment dispersion liquid and an inkjet ink each enabling formation of a colored product having high chroma and a yellowish hue by realizing a technique that can provide an excellent quinacridone solid solution pigment, as described above, which is suitable, for example, as a colorant for an inkjet ink.

Solution to Problem

The above-described problems of the conventional techniques are solved by the present invention described below. That is, the present invention provides:

[1] A method for producing a quinacridone solid solution pigment, the method including: a step of producing a crude quinacridone solid solution; a drying step of drying the crude quinacridone solid solution; and a pigmentation step of heating a dried crude quinacridone solid solution in a solvent, thereby making the dried crude quinacridone solid solution into a pigment, wherein: in the step of producing a crude quinacridone solid solution, a diarylaminoterephthalic acid and a dialkylarylaminoterephthalic acid are subjected to a co-cyclization reaction in polyphosphoric acid, thereby obtaining a water-containing crude quinacridone solid solution such that water is contained in a solid solution having a mass ratio of unsubstituted quinacridone to a 2,9-dialkylquinacridone of 85:15 to 60:40; in the drying step, the water-containing crude quinacridone solid solution is dried, thereby making a water content less than 1% and obtaining a powdery, crude quinacridone solid solution; and, in the pigmentation step, the powdery, crude quinacridone solid solution is heated in a liquid medium that does not dissolve the crude quinacridone solid solution.

Preferred embodiments of the above-described method for producing a quinacridone solid solution pigment of the present invention include the embodiments described below.

[2] The method for producing a quinacridone solid solution pigment according to [1], wherein the diarylaminoterephthalic acid is 2,5-dianilinoterephthalic acid, and the dialkylarylaminoterephthalic acid is 2,5-di(p-toluidino)terephthalic acid.

[3] The method for producing a quinacridone solid solution pigment according to [1] or [2], wherein a quinacridone-based pigment derivative is allowed to exist when the powdery, crude quinacridone solid solution is heated in the liquid medium in the pigmentation step.

[4] The method for producing a quinacridone solid solution pigment according to [3], wherein the quinacridone-based pigment derivative is 2-phthalimidemethylquinacridone.

[5] The method for producing a quinacridone solid solution pigment according to any one of [1] to [4], wherein the liquid medium that does not dissolve the crude quinacridone solid solution is dimethyl sulfoxide.

[6] The method for producing a quinacridone solid solution pigment according to [5], wherein a heating temperature in the pigmentation step is 60° C. or higher and 120° C. or lower.

[7] The method for producing a quinacridone solid solution pigment according to any one of [1] to [6], wherein the method is for obtaining a quinacridone solid solution pigment having a major axis diameter of particles of 20 to 80 nm.

The present invention provides as another embodiment a pigment dispersion liquid described below.

[8] A pigment dispersion liquid containing: a quinacridone solid solution pigment of unsubstituted quinacridone and a 2,9-dialkylquinacridone; a pigment dispersant; and water, wherein the quinacridone solid solution pigment has peculiar diffraction peaks where values of 2θ in (2θ±0.2°) expressed using a Bragg angle (θ) are 27.5°, 13.8°, and 6.0° in powder X-ray diffraction.

The present invention provides as yet another embodiment an inkjet ink described below.

[9] An inkjet ink containing: a quinacridone solid solution pigment comprising a solid solution of unsubstituted quinacridone and a 2,9-dialkylquinacridone, and having a major axis diameter of particles of 20 to 80 nm; a pigment dispersant; and water, wherein the quinacridone solid solution pigment has peculiar diffraction peaks where values of 2θ in (2θ±0.2°) expressed using a Bragg angle (θ) are 27.5°, 13.8°, and 6.0° in powder X-ray diffraction.

Advantageous Effects of Invention

According to the present invention, a quinacridone solid solution pigment of unsubstituted quinacridone and a 2,9-dialkylquinacridone, the quinacridone solid solution pigment allowing a colored product formed to have high chroma and a desired, properly yellowish hue, is provided. Further, in addition to the above-described effect, according to a preferred embodiment of the present invention, it is made possible to provide a quinacridone solid solution pigment in which the particle diameter is controlled into appropriate sizes, which is an important requirement in practical use. Moreover, according to the present invention, it is made possible to provide a pigment dispersion liquid and an inkjet ink which can realize formation of a colored product having high chroma and a desired, properly yellowish hue by applying the above-described excellent quinacridone solid solution pigment to a colorant.

DESCRIPTION OF EMBODIMENTS

Next, the present invention will be described in more detail giving preferred embodiments for carrying out the invention. The present inventors have conducted diligent studies in order to solve the previously described problems in the conventional techniques to obtain the knowledge described below and have completed the present invention. Firstly, it has been found that when a solid solution pigment of unsubstituted quinacridone and a 2,9-dialkylquinacridone is made, the mass ratio of the unsubstituted quinacridone to the 2,9-dialkylquinacridone needs to be 85:15 to 60:40 in order to make the hue of a resultant pigment yellowish. Therefore, when a water-containing crude quinacridone solid solution such that water is contained in the solid solution of unsubstituted quinacridone and a 2,9-dialkylquinacridone, the solid solution having the above-described mass ratio, is obtained, and this solid solution is made into a pigment, production of a yellowish quinacridone solid solution pigment is thereby made possible.

The present inventors have conducted further studies in order to achieve the previously described objects of the present invention. Firstly, the water-containing crude quinacridone solid solution such that water is contained in the solid solution of unsubstituted quinacridone to a 2,9-dialkylquinacridone, the solid solution having the above-described mass ratio, is obtained by subjecting a diarylaminoterephthalic acid and a dialkylarylaminoterephthalic acid to a co-cyclization reaction in polyphosphoric acid. In a conventional method for producing a quinacridone solid solution pigment of unsubstituted quinacridone and a 2,9-dialkylquinacridone, the water-containing crude quinacridone solid solution produced in this manner is heated in a solvent keeping the water-containing state as it is to be made into a pigment. According to studies conducted by the present inventors, it has been found that a pigment obtained by pigmentation in such a conventional production method is more yellowish than the crude quinacridone solid solution used as a raw material and does not allow a resultant colored product to have high chroma and a desired, properly yellowish hue, the high chroma and the properly yellowish hue each being an object of the present invention. The present inventors have further conducted studies in order to find a method for producing a quinacridone solid solution pigment which can improve these points and allows a colored product to have high chroma and a properly yellowish, satisfactory hue, the high chroma and the properly yellowish, satisfactory hue each being desired in the market.

As a result, the present inventors have found that when a drying step for making a powdery, crude quinacridone solid solution is newly provided before the pigmentation step in the above-described conventional method for producing a quinacridone solid solution pigment, and in this drying step, drying is performed until the water content becomes less than 1% to thereafter perform the pigmentation of the dried, powdery, crude quinacridone solid solution, a colored product formed with a resultant quinacridone solid solution pigment has thereby higher chroma and a more properly yellowish hue as compared to a colored product formed using a solid solution pigment obtained by the conventional production method. In addition, according to studies conducted by the present inventors, it has been found that when the constitution of the production method of the present invention is made suitable, the particle diameter of a resultant quinacridone solid solution pigment can thereby be controlled into desired, fine size. Particularly, according to a preferred embodiment of the present invention, a quinacridone solid solution pigment having a particle diameter suitable for an inkjet ink in which ejection stability of the ink is demanded can also be provided.

<Method for Producing Quinacridone Solid Solution Pigment>

A method for producing a quinacridone solid solution pigment of the present invention includes: a production step of obtaining a water-containing crude quinacridone solid solution having a particular composition; a drying step of drying the water-containing crude quinacridone solid solution; and a pigmentation step of heating a dried, powdery, crude quinacridone solid solution in a solvent, thereby making the dried, powdery, crude quinacridone solid solution into a pigment, and is particularly characterized in that the drying step for drying the water-containing crude quinacridone solid solution having a particular composition to make the water content less than 1% is newly provided. Specifically, a water-containing crude quinacridone solid solution having a mass ratio of unsubstituted quinacridone to a 2,9-dialkylquinacridone of 85:15 to 60:40 and having a yellowish hue, is first obtained in the same manner as in the conventional method for producing a crude quinacridone solid solution. Subsequently, in the next drying step that characterizes the present invention, the above-obtained water-containing crude quinacridone solid solution having a particular composition is dried until the water content becomes less than 1%, thereby obtaining a powdery, crude quinacridone solid solution. Subsequently, the powdery, crude quinacridone solid solution having a water content of less than 1% is made into a pigment in the pigmentation step which is performed after the drying step. In the pigmentation step, the crude quinacridone solid solution is heated in a liquid medium that does not dissolve the crude quinacridone solid solution to perform the pigmentation in the same manner as performed in the conventional production method. According to studies conducted by the present inventors, the water-containing crude quinacridone solid solution having a particular composition, when dried until the water content becomes less than 1% by the above-described production method of the present invention, has a yellowish hue which is somewhat bluish as compared to the hue of the water-containing crude quinacridone solid solution. As a result, it has been found that a quinacridone solid solution pigment which is finally obtained through the pigmentation has high chroma and a properly yellowish, satisfactory hue.

In addition, according to studies conducted by the present inventors, it is made possible to control the particle diameter of a resultant quinacridone solid solution pigment stably to an appropriate size by using dimethyl sulfoxide as the liquid medium. Further, it has been found that particularly when the pigmentation is performed through heating in this liquid medium, it is made possible to control the particle diameter of a resultant quinacridone solid solution pigment stably to a size suitable for the intended use by setting the heating temperature in such a way as to fall within a range of 60° C. or higher and 120° C. or lower.

In addition, according to studies conducted by the present inventors, it has been found that by allowing a quinacridone-based pigment derivative to exist when the dried, powdery, crude quinacridone solid solution is heated in the liquid medium, thereby making the dried, powdery, crude quinacridone solid solution into a pigment, an effect of making the particles of a resultant quinacridone solid solution pigment uniform and an effect of making the chroma of a colored product high can further be enhanced.

The "quinacridone solid solution pigment" herein refers to a pigment in which a plurality of different quinacridone pigment molecules exists in a mixed state of being dissolved in one another and in a uniform solid phase state, and is not a pigment obtained by simply mixing a plurality of different quinacridone pigments. It is known that the properties such as color are changed by producing a solid solution. The present invention intends to produce "a solid solution of unsubstituted quinacridone and a 2,9-dialkylquinacridone". It is to be noted that the unsubstituted quinacridone singly corresponds to C.I. Pigment Violet 19, and the 2,9-dialkylquinacridone singly corresponds to C.I. Pigment Red 122. Hereinafter, each step in the production method of the present invention will be described.

(Step of Producing Crude Quinacridone Solid Solution)

In the production method of the present invention, a water-containing crude quinacridone solid solution containing: unsubstituted quinacridone and a 2,9-dialkylquinacridone each in a particular ratio; and water is first obtained in the step of producing a crude quinacridone solid solution. Specifically, a diarylaminoterephthalic acid and a dialkylarylaminoterephthalic acid are subjected to a co-cyclization reaction in polyphosphoric acid, and thereby a water-containing crude quinacridone solid solution having the above-described constitution and containing water is easily obtained. This step is the same as a conventional method for obtaining a quinacridone-based solid solution pigment. It is to be noted that in the conventional production method, the pigmentation of the crude quinacridone solid solution is performed keeping this water-containing state as it is.

As the diarylaminoterephthalic acid which is used in the above-described step, for example, 2,5-dianilinoterephthalic acid is preferable. In addition, as the dialkylarylaminoterephthalic acid, for example, 2,5-di(p-toluidino)terephthalic acid is preferable. To more stably obtain the quinacridone solid solution pigment that is the final object in the present invention and that allows a colored product produced therewith to have high chroma and a properly yellowish, satisfactory hue, it is preferable to use these compounds.

According to studies conducted by the present inventors, to obtain the quinacridone solid solution pigment that is demanded in the market and that allows a colored product produced therewith to have high chroma and a properly yellowish, satisfactory hue, the mass ratio of the unsubstituted quinacridone to the 2,9-dialkylquinacridone, which constitute the crude quinacridone solid solution to be obtained by the above-described co-cyclization reaction, needs to be 85:15 to 60:40.

(Drying Step)

The production method of the present invention is different from the conventional method for producing a quinacridone solid solution pigment and is characterized in that in the drying step, which is newly provided, the water-containing crude quinacridone solid solution which is obtained in the step of producing a crude quinacridone solid solution and has the above-described constitution is dried, thereby obtaining a powdery, crude quinacridone solid solution having a water content of less than 1%, and thereafter the dried crude quinacridone solid solution is made into a pigment. As described previously, in the present invention, a water-containing yellowish crude quinacridone solid solution having a mass ratio of unsubstituted quinacridone to a 2,9-dialkylquinacridone of 85:15 to 60:40 is first obtained as a water-containing yellowish crude quinacridone solid solution to be a raw material. Subsequently, the water content of this water-containing crude quinacridone solid solution is made less than 1% in the drying step specified in the present invention, and thereafter the pigmentation is performed, so that obtaining a useful quinacridone solid solution pigment that allows a colored product formed to have high chroma and a properly yellowish, satisfactory hue when the quinacridone solid solution pigment is used as a colorant is realized. An important thing in the present invention is that: a water-containing crude quinacridone solid solution having the above-described characteristic composition is obtained; this water-containing crude quinacridone solid solution is dried sufficiently to make a powdery, crude quinacridone solid solution having a water content of less than 1%; and this powdery, crude quinacridone solid solution is made into a pigment.

The technical feature of the present invention is that: the unsubstituted quinacridone and the 2,9-dialkylquinacridone, which constitute the crude quinacridone, are added in such a way that the mass ratio makes a particular composition; and besides, a step of drying the water-containing crude quinacridone solid solution, which has never been carried out in the conventional production method, is newly provided to make the water content of the water-containing crude quinacridone solid solution less than 1%. As a result of making the constitution as described above, a quinacridone solid solution pigment with which a colored product having high chroma and a properly yellowish, satisfactory hue is obtained can stably be obtained.

In contrast, as described previously, if the yellowish, water-containing crude quinacridone solid solution is made into a pigment as it is, the hue is more yellowish, so that a pigment having a desired hue is not made. In addition, according to studies conducted by the present inventors, even if the yellowish, water-containing crude quinacridone solid solution is dried, unless the yellowish water-containing crude quinacridone solid solution is dried sufficiently, specifically if the water content is 1% or larger, a pigment that is an object of the present invention and that allows a colored product formed to have high chroma and a properly yellowish, satisfactory hue is not made. Specifically, b* of the colored product formed is made too large, and therefore the hue of the colored product formed with a quinacridone solid solution pigment which is finally obtained has a more yellowish hue than the hue as a target, so that a colored product having a properly yellowish hue which has been required in the market in recent years is not made. This point will be described later.

(Pigmentation Step)

In the production method of the present invention, the "powdery, crude quinacridone solid solution the water content of which is made less than 1%" obtained in the pigmentation step is heated in a liquid medium that does not dissolve the crude quinacridone solid solution and is thereby made into a pigment. Basically, this step may be the same as a pigmentation method performed in the conventional method.

Examples of the liquid medium that does not dissolve the crude quinacridone solid solution which is used when the pigmentation is performed include liquid media, like dimethylformamide, dimethyl sulfoxide, N-methylpyrrolidone, ethanol, propanol, butanol, and ethylene glycol. It is described in Patent Literature 2 given previously as a conventional technique that dimethylformamide and butanol are preferable among the above-described liquid media. In addition, in Patent Literature 2, it is also described that as the heating temperature, an optional temperature from 25 to 140° C. can be adopted.

The present inventors have also conducted diligent studies on the pigmentation step that constitutes the production method of the present invention in order to achieve the objects of the present invention and obtain more remarkable effects. As a result, the present inventors have found that devising the type of the liquid medium to be used and, further, devising the temperature of heating in the liquid medium are more effective in the first place. That is, the present inventors have found that a more preferred quinacridone solid solution pigment is obtained when dimethyl sulfoxide is used as the liquid medium that does not dissolve the crude quinacridone solid solution or when the heating temperature in the pigmentation step is set to 60° C. or higher and 120° C. or lower.

Specifically, as described previously, the present inventors have found that it is effective to dry the crude quinacridone solid solution which is obtained in a water-containing state until the water content becomes less than 1% in the drying step, which is newly provided, and make this powdery, crude quinacridone solid solution into a pigment, and besides, that when the powder of the crude quinacridone solid solution is heated in the solvent of dimethyl sulfoxide in the pigmentation step, the particle diameter of a resultant quinacridone solid solution pigment can be controlled into an appropriate, desired size. The present inventors have further found that when the heating temperature on that occasion is set within a particular temperature range of 60° C. or higher and 120° C. or lower, the particle diameter of a resultant quinacridone solid solution pigment can be more stably controlled into a desired size suitable for the intended use.

For example, in the case where a fine quinacridone solid solution pigment which is used as a colorant for an inkjet ink containing a colorant dispersed in an aqueous medium is obtained, when the heating temperature exceeds 120° C., the particle diameter of the quinacridone solid solution pigment is made too large. On the other hand, when the heating temperature is lower than 60° C., the particle diameter of the quinacridone solid solution pigment is made too small, and therefore, in any of the cases, it is made difficult to disperse a resultant quinacridone solid solution pigment satisfactory in the aqueous medium.

According to studies conducted by the present inventors, the above-described effect of controlling the particle diameter of a resultant quinacridone solid solution pigment is particularly remarkable when dimethyl sulfoxide is used as the solvent which is used in the pigmentation step.

In addition, according to studies conducted by the present inventors, when the dried, powdery, crude quinacridone solid solution is heated in dimethyl sulfoxide in the pigmentation step, it is effective to, further, add a quinacridone-based pigment derivative and perform the pigmentation in a state where the quinacridone-based pigment derivative is allowed to exist. Such constitution can further improve the effect of making the particles of a resultant quinacridone solid solution pigment uniform and the effect of making the chroma of a colored product formed high. Examples of the quinacridone-based pigment derivative which is used above include 2-phthalimidemethylquinacridone.

<Quinacridone Solid Solution Pigment>

As described previously, the quinacridone solid solution pigment which is obtained by the production method of the present invention contains unsubstituted quinacridone and a 2,9-dialkylquinacridone as essential components, and forms a mixed phase which is constituted in such a way that these are each in a particular mass ratio and in which the 2,9-dialkylquinacridone is regarded as dissolving into the crystal phase of the unsubstituted quinacridone. Therefore, the quinacridone solid solution pigment obtained by the production method of the present invention has peculiar diffraction peaks obtained by powder X-ray diffraction and represented by (2θ) expressed using a Bragg angle (θ), the peculiar diffraction peaks not existing in a single crystal of the unsubstituted quinacridone and a single crystal of the 2,9-dialkylquinacridone. Accordingly, whether a pigment is a solid solution or a mixture of these single crystals can easily be decided by powder X-ray diffraction.

The quinacridone solid solution pigment which is obtained by the production method of the present invention and which enables providing a colored product having high chroma and a properly yellowish, satisfactory hue has a characteristic that it has peculiar diffraction peaks at 27.5°, 13.8°, and 6.0° as values of 2θ in (2θ±0.2°) expressed using a Bragg angle (θ) in the powder X-ray diffraction. More specifically, the quinacridone solid solution pigment is characterized by having peculiar diffraction peaks at positions where the values of 2θ are 27.3° to 27.7°, 13.6° to 14.0°, and 5.8° to 6.2°. In addition, when the intensity of the peak at 6.0° specified in the present invention is assumed to be 100, the intensity ratio of the peak at 13.8° is 70 to 80, and the intensity ratio of the peak at 27.5° is 55 to 70.

The particle diameter of the quinacridone solid solution pigment which is obtained by the production method of the present invention is not particularly limited, and the quinacridone solid solution pigment having an appropriate particle diameter may be produced according to the intended use. For example, in the case of the quinacridone solid solution pigment for use as a colorant for an inkjet ink of the present invention, the quinacridone solid solution pigment produced under the condition of making the major axis diameter of particles 20 to 80 nm is used taking the ejection stability and the like of the inkjet ink into consideration. Further, the major axis diameter of particles of the quinacridone solid solution pigment is more preferably about 30 nm. It is to be noted that the major axis diameter of particles is an average value obtained when the particles are observed by a transmission electron microscope.

<Inkjet Ink>

An inkjet ink of the present invention contains, as a colorant, a quinacridone solid solution pigment having a major axis diameter of particles of 20 to 80 nm, the quinacridone solid solution pigment having peculiar diffraction peaks where values of 2θ in (20±0.2°) expressed using a Bragg angle (θ) are 27.5°, 13.8°, and 6.0° in powder X-ray diffraction. Such a quinacridone solid solution pigment can easily be obtained by the previously described production method of the present invention. Further, the inkjet ink of the present invention contains a pigment dispersant in order to improve the dispersibility and dispersion stability of the quinacridone solid solution pigment, and the storage stability of the ink with time. As the pigment dispersant, those which have been used in conventionally known inkjet aqueous pigment inks can appropriately be used. Besides, if necessary, additives, such as a surfactant, an organic solvent, and a humectant, may be added to the inkjet ink of the present invention, and known techniques on inkjet aqueous pigment inks can also be applied to these additives.

The inkjet ink of the present invention contains a quinacridone solid solution pigment that allows a colored product produced therewith to have high chroma and a properly yellowish, satisfactory hue. The amount of the quinacridone solid solution pigment to be added is not particularly limited, and the quinacridone solid solution may be added in a conventionally known range. Specifically, the amount of the quinacridone solid solution pigment to be added may be about 0.5 to about 30% by mass, more preferably about 4 to about 10% by mass in 100% by mass of the ink. When the amount added is less than 0.5% by mass, the print density cannot be secured in some cases, and on the other hand, when the amount added exceeds 30% by mass, a viscosity increase occurs in the ink and structural viscosity occurs in viscosity properties, so that the ejection stability of the ink from an inkjet head is deteriorated in some cases.

EXAMPLES

Hereinafter, the present invention will further be described giving Examples and Comparative Examples. It is to be noted that "%" and "part(s)" described below are each on a mass basis unless otherwise noted.

[Quinacridone Solid Solution Pigment]

Example 1

Into a 100-ml separable flask, 65.6 g of 85% phosphoric acid was weighed and placed, and 98.7 g of phosphoric anhydride was added to prepare 84.0% polyphosphoric acid. When the internal temperature was lowered to about 100° C., 6.12 g of 2,5-di(p-toluidino)terephthalic acid (DM-DATA) and, subsequently, 14.28 g of 2,5-dianilinoterephthalic acid (DATA) were added gradually. After the addition was completed, a co-cyclization reaction was performed at 120° C. for 4 hours. After the reaction was completed, the reaction liquid was put into a 1-L beaker with 400 ml of normal-temperature water filled therein. After filtration and washing with water were performed, a resultant liquid was transferred to a 1-L beaker, 800 ml of water was added thereto to perform stirring, and caustic soda was added thereto to adjust pH to 7 to 8. This mixture was subjected to filtration and washing with hot water to obtain a water-containing crude quinacridone solid solution. This crude quinacridone solid solution had a mass ratio of the unsubstituted quinacridone to the 2,9-dialkylquinacridone of 7:3.

The water-containing crude quinacridone solid solution obtained above was dried at 80° C. overnight to make the water content less than 1%. Pulverization was performed after the drying to obtain 18.0 g of a powder of the crude quinacridone solid solution. The obtained powder was observed with a transmission electron microscope to find that the average major axis diameter of particles was about 20 nm.

Next, dimethyl sulfoxide (DMSO) was used as a liquid medium that does not dissolve the above-described powder to make the crude quinacridone solid solution into a pigment. Specifically, 7.0 g of the powder of the crude quinacridone solid solution obtained above and 70.0 g of dimethyl sulfoxide were loaded in a 100-mL separable flask, the temperature was raised to 80° C. over 30 minutes to perform a heat treatment at the same temperature for 1 hour. After the heat-treated mixture was cooled to 70° C. or lower, the heat-treated mixture was subjected to filtration and washed with hot water and with water until the filtrate became colorless, and drying was then performed at 80° C. to obtain a powder of a quinacridone solid solution pigment of the present Example.

Whether the pigment obtained above is a quinacridone solid solution which is an object of the present invention was checked by powder X-ray diffraction. Specifically, the powder of the quinacridone solid solution pigment to be measured was filled in a predetermined holder, and measurement was conducted using mini Flex600 (trade name, manufactured by Rigaku Corporation, the same apparatus was used in other examples), which is a powder X-ray diffraction apparatus. As a result, the quinacridone solid solution pigment obtained above had peaks at 27.5°, 13.8°, and 6.0° in terms of a value of 2θ obtained by powder X-ray diffraction. In addition, the intensity ratio of the peaks was about 63:about 78:100.

In addition, the pigment particles of the quinacridone solid solution pigment obtained above were observed with a transmission electron microscope to find that the average major axis diameter of particles was about 30 nm. This is referred to as quinacridone solid solution pigment 1 or is simply referred to as solid solution pigment 1. Evaluation results of the color in a colored product which is obtained in the case where quinacridone solid solution pigment 1 obtained above is used will be described later together with those of the other examples.

Example 2

In the present Example, the powdery, crude quinacridone solid solution obtained in Example 1 was used and, further, heated in the presence of a quinacridone-based pigment derivative to be made into a pigment. Specifically, 7.0 g of the powder of the crude quinacridone solid solution obtained in Example 1, 70.0 g of dimethyl sulfoxide (DMSO) as a liquid medium, and 0.35 g of a 2-phthalimidemethylquinacridone powder being a quinacridone-based pigment derivative were loaded in a 100-mL separable flask, and the temperature was raised to 80° C. over 30 minutes to perform a treatment at the same temperature for 3 hours. After the treated mixture was cooled to 70° C. or lower, the treated mixture was subjected to filtration, and washed with hot water and with water until the filtrate became colorless, and drying was then performed at 80° C. to obtain a powder of a quinacridone solid solution pigment of the present Example.

Whether the pigment obtained above is a quinacridone solid solution which is an object of the present invention was checked by powder X-ray diffraction. As a result, the pigment obtained above had peaks at 27.5°, 13.8°, and 6.0° in terms of a value of 2θ obtained by powder X-ray diffraction. In addition, the intensity ratio of the peaks was about 64:about 77:100. In addition, the pigment particles were observed with a transmission electron microscope in the same manner as in Example 1 to find that the average major axis diameter of particles was about 25 nm. This is referred to as quinacridone solid solution pigment 2 or is simply referred to as solid solution pigment 2.

Example 3

Into a 100-ml separable flask, 65.6 g of 85% phosphoric acid was weighed and placed, and 98.7 g of phosphoric anhydride was added to prepare 84.0% polyphosphoric acid. When the internal temperature was lowered to about 100° C., 4.08 g of 2,5-di(p-toluidino)terephthalic acid (DM-DATA) and, subsequently, 16.32 g of 2,5-dianilinoterephthalic acid (DATA) were added gradually. After the addition was completed, a co-cyclization reaction was performed at 120° C. for 4 hours. After the reaction was completed, the reaction liquid was put into a 1-L beaker with 400 ml of normal-temperature water filled therein. After filtration and washing with water were performed, a resultant liquid was transferred to a 1-L beaker, 800 ml of water was added thereto to perform stirring, and caustic soda was added thereto to adjust pH to 7 to 8. This mixture was subjected to filtration and washing with hot water to obtain a water-containing crude quinacridone solid solution. The crude quinacridone solid solution had a mass ratio of the unsubstituted quinacridone to the 2,9-dialkylquinacridone of 8:2.

The water-containing crude quinacridone solid solution obtained above was dried at 80° C. overnight to make the water content less than 1%. Pulverization was performed after the drying to obtain 17.9 g of a powder of the crude quinacridone solid solution. The obtained powder was observed with a transmission electron microscope to find that the average major axis diameter of particles was about 20 nm.

Next, the crude quinacridone solid solution was made into a pigment by the same operation as in Example 1 to obtain a powder of a quinacridone solid solution pigment of the present Example.

The pigment obtained above had peaks at 27.6°, 13.8°, and 6.1° in terms of a value of 2θ obtained by powder X-ray diffraction, and the intensity ratio of the peaks was about 57:about 77:100. In addition, the pigment particles were observed with a transmission electron microscope in the same manner as in Example 1 to find that the average major axis diameter of particles was about 30 nm. This is referred to as quinacridone solid solution pigment 3 or is simply referred to as solid solution pigment 3.

Example 4

Into a 100-ml separable flask, 65.6 g of 85% phosphoric acid was weighed and placed, and 98.7 g of phosphoric anhydride was added to prepare 84.0% polyphosphoric acid. When the internal temperature was lowered to about 100° C., 8.16 g of 2,5-di(p-toluidino)terephthalic acid (DM-DATA) and, subsequently, 12.24 g of 2,5-dianilinoterephthalic acid (DATA) were added gradually. After the addition was completed, a co-cyclization reaction was performed at 120° C. for 4 hours. After the reaction was completed, the reaction liquid was put into a 1-L beaker with 400 ml of normal-temperature water filled therein. After filtration and washing with water were performed, a resultant liquid was transferred to a 1-L beaker, 800 ml of water was added thereto to perform stirring, and caustic soda was added thereto to adjust pH to 7 to 8. This mixture was subjected to filtration and washing with hot water to obtain a water-containing crude quinacridone solid solution. The crude quinacridone solid solution had a mass ratio of the unsubstituted quinacridone to the 2,9-dialkylquinacridone of 6:4.

The water-containing crude quinacridone solid solution obtained above was dried at 80° C. overnight to make the water content less than 1%. Pulverization was performed after the drying to obtain 18.1 g of a powder of the crude quinacridone solid solution. The obtained powder was observed with a transmission electron microscope to find that the average major axis diameter of particles was about 20 nm.

Next, the crude quinacridone solid solution was made into a pigment by the same operation as in Example 1 to obtain a powder of a quinacridone solid solution pigment of the present Example.

The pigment obtained above had peaks at 27.4°, 13.8°, and 5.9° in terms of a value of 2θ obtained by powder X-ray diffraction, and the intensity ratio of the peaks was about 71:about 76:100. In addition, the pigment particles were observed with a transmission electron microscope in the same manner as in Example 1 to find that the average major axis diameter of particles was about 30 nm. This is referred to as quinacridone solid solution pigment 4 or is simply referred to as solid solution pigment 4.

Comparative Example 1

Into a 100-ml separable flask, 65.6 g of 85% phosphoric acid was weighed and placed, and 98.7 g of phosphoric anhydride was added to prepare 84.0% polyphosphoric acid. When the internal temperature was lowered to about 100° C., 14.28 g of 2,5-di(p-toluidino)terephthalic acid (DM-DATA) and, subsequently, 6.12 g of 2,5-dianilinoterephthalic acid (DATA) were added gradually. After the addition was completed, a co-cyclization reaction was performed at 120° C. for 4 hours. After the reaction was completed, the reaction liquid was put into a 1-L beaker with 400 ml of normal-temperature water filled therein. After filtration and washing with water were performed, a resultant liquid was transferred to a 1-L beaker, 800 ml of water was added thereto to perform stirring, and caustic soda was added thereto to adjust pH to 7 to 8. This mixture was subjected to filtration and washing with hot water to obtain a water-containing crude quinacridone solid solution. The crude quinacridone solid solution had a mass ratio of the unsubstituted quinacridone to the 2,9-dialkylquinacridone of 3:7, and the mass ratio was out of the range specified in the present invention.

The water-containing crude quinacridone solid solution obtained above was dried at 80° C. overnight to make the water content less than 1%. Pulverization was performed after the drying to obtain 18.0 g of a powder of the crude quinacridone solid solution. The obtained powder was observed with a transmission electron microscope to find that the average major axis diameter of particles was about 20 nm.

Next, dimethyl sulfoxide was used as a liquid medium that does not dissolve the above-described powder to make the crude quinacridone solid solution into a pigment. Specifically, 7.0 g of the powder of the crude quinacridone solid solution obtained above and 70.0 g of dimethyl sulfoxide were loaded in a 100-mL separable flask, the temperature was raised to 105° C. over 1 hour to perform a heat treatment at the same temperature for 1 hour. After the heat-treated mixture was cooled to 70° C. or lower, the heat-treated mixture was subjected to filtration and washed with hot water and with water until the filtrate became colorless, and drying was then performed at 80° C. to obtain a powder of a quinacridone solid solution pigment of the present Comparative Example.

The pigment obtained above had peaks at 27.3°, 13.9°, and 5.6° in terms of a value of 2θ obtained by powder X-ray diffraction, and it was ascertained the peaks are different from the combination of the peculiar diffraction peaks specified in the present invention. In addition, the intensity ratio of these peaks was about 75:about 65:100. Moreover, the pigment particles were observed with a transmission electron microscope to find that the average major axis diameter of particles was about 50 nm. This is referred to as comparative quinacridone solid solution pigment 1 or is simply referred to as comparative solid solution pigment 1.

Comparative Example 2

Two different quinacridone pigments of crude unsubstituted quinacridone and crude 2,9-dimethylquinacridone were mixed in a composition ratio of 7:3 in such a way that the mass ratio was the same as that of the solid solution pigment of Example 1, and then made into a pigment with dimethyl sulfoxide. Specifically, 7.0 g of a powder of the crude mixed quinacridone and 70.0 g of dimethyl sulfoxide were loaded in a 100-mL separable flask, the temperature was raised to 80° C. over 30 minutes to perform a heat treatment at the same temperature for 1 hour. After the heat-treated mixture was cooled to 70° C. or lower, the heat-treated mixture was subjected to filtration and washed with hot water and with water until the filtrate became colorless, and drying was then performed at 80° C. to obtain a powder of a quinacridone pigment of the present Comparative Example, the quinacridone pigment being a mixture of two different quinacridone pigments. In addition, the pigment particles were observed with a transmission electron microscope to find that the average major axis diameter of particles was about 30 nm. This is referred to as comparative quinacridone pigment 2 or is simply referred to as comparative pigment 2.

<Evaluation 1>

An original color paint film and a light color paint film were prepared with two types of paints each obtained in the manner as described below using each quinacridone solid solution pigment obtained in each of Examples 1 to 4 and Comparative Example 1. Subsequently, L*a*b* values of each paint film were measured to evaluate the tint. Obtained results are shown in Table 1.

1. Preparation of Paint (1) Preparation of Base Paint

In a plastic container, 0.8 g of each pigment of Examples and Comparative Examples, 5.0 g of an alkyd-melamine resin (trade name: 106-3700 Lacquer Clear Art Clear; manufactured by Isamu Paint Co., Ltd.), 5.0 g of a thinner (trade name: Nippe 2500 Thinner, manufactured by Nippon Paint Co., Ltd.), which contains toluene, ethyl acetate, and butanol as the main components, and 50.0 g of a glass bead were loaded. Subsequently, this mixture was dispersed with a paint shaker for 1 hour, 35.0 g of the alkyd-melamine resin and 4.0 g of the thinner were then added, and a resultant mixture was dispersed for 10 minutes to obtain a dispersion liquid of each pigment. In a plastic container, 10.0 g of each dispersion liquid obtained and 20.0 g of the alkyd-melamine resin were loaded, and a resultant mixture was dispersed and mixed with MAZERUSTAR (trade name, manufactured by Kurabo Industries Ltd.) to make a base paint containing each pigment.

(2) Preparation of Light Color Paint

In a plastic container, 0.8 g of each pigment of Examples and Comparative Examples, 5.0 g of the previously described alkyd-melamine resin, 5.0 g of the previously described thinner, and 50 g of a glass bead were loaded. Subsequently, this mixture was dispersed with a paint shaker for 1 hour, 35.0 g of the previously described alkyd-melamine resin and 4.0 g of the previously described thinner were added, and a resultant mixture was dispersed for 10 minutes to obtain a dispersion liquid of each pigment. In a plastic container, 10.0 g of each dispersion liquid obtained and 20.0 g of a white ink (trade name: 10 Super 300 White, manufactured by Nippon Paint Co., Ltd.), which contains titanium oxide as the main component, were loaded, and a resultant mixture was dispersed with MAZERUSTAR to make a light color paint containing each pigment.

2. Preparation of Colored Products and Evaluation of Hue (1) Each base paint prepared was applied on white paper using a 6-mil applicator (application machine), and this white paper was dried at room temperature for several hours. Comparative evaluation of the hue was conducted by visual observation and with a colorimeter with respect to each piece of white paper (hereinafter, referred to as original color paint film) thus prepared and colored using the paint containing each pigment of Examples and Comparative Examples. The results are shown in Table 1. It is to be noted that the visual observation is relative evaluation.

(2) Each light color paint prepared was applied on white paper using a 6-mil applicator, and this white paper was dried at room temperature for several hours. Evaluation of the hue of each colored product (hereinafter, referred to as light color paint film) thus prepared was also conducted in the same manner as described above, and the results are shown in Table 1.

(3) The colorimetric values each obtained by colorimetric measurement using a colorimeter with respect to the original color paint films and light color paint films of Examples 1 to 4 and Comparative Examples 1 and 2, each prepared above, are shown in Table 1. On that occasion, the colorimetric measurement was conducted using CM-3600d (trade name, manufactured by Konica Minolta, Inc.), which is a spectrophotometer. L* represents brightness, C* represents chroma, and the chroma C* was determined by $\sqrt{(a^*)^2+(b^*)^2}$.

TABLE 1

Evaluation results

| | Solid solution pigment Particle diameter (nm) | Ratio[1] | C illuminant/ 10-degree visual field | L* (Brightness) | a* | b* | C* (Chroma) | Visual observation Tint | Vividness |
|---|---|---|---|---|---|---|---|---|---|
| Example 1 | about 30 | 7:3 | Original color paint film | 44.85 | 72.62 | −2.99 | 72.68 | Yellowish | High |
| | | | Light color paint film | 62.10 | 48.82 | −15.45 | 51.21 | Yellowish | High |
| Example 2 | about 25 | 7:3[2] | Original color paint film | 45.04 | 72.63 | −2.53 | 72.67 | Yellowish | High |
| | | | Light color paint film | 62.15 | 48.94 | −15.08 | 51.21 | Yellowish | High |
| Example 3 | about 30 | 8:2 | Original color paint film | 45.54 | 72.65 | −0.1 | 72.65 | Yellowish | High |
| | | | Light color paint film | 62.20 | 49.32 | −13.96 | 51.26 | Yellowish | High |
| Example 4 | about 30 | 6:4 | Original color paint film | 44.35 | 72.84 | −5.92 | 73.08 | Yellowish | High |
| | | | Light color paint film | 61.41 | 48.76 | −17.11 | 51.67 | Yellowish | High |
| Comparative Example 1 | about 50 | 3:7 | Original color paint film | 42.63 | 70.42 | −13.14 | 71.64 | Bluish | High |
| | | | Light color paint film | 60.86 | 45.11 | −20.86 | 49.70 | Bluish | High |
| Comparative Example 2 | about 30 | 7:3 (Mixed) | Original color paint film | 44.09 | 72.27 | −1.87 | 72.29 | Yellowish | Low |
| | | | Light color paint film | 61.43 | 47.67 | −14.69 | 49.88 | Yellowish | Low |

[1]Mass ratio of unsubstituted quinacridone:2,9-dialkylquinacridone
[2]Quinacridone-based pigment derivative was used together The difference between Example 1 and Comparative Example 1 is only the difference in the mass ratio of the unsubstituted quinacridone to the 2,9-dialkylquinacridone, but as shown in Table 1, a large difference was recognized in the b* value in particular. It is indicated that when the b* value is smaller, the hue is more bluish as a result of a blue shift, and when the b* value is larger, the hue is more yellowish, which correspond to the results of the visual observation. It was ascertained that the solid solution pigments obtained in the other Examples also had a large b* value and had a yellowish hue. In addition, it was ascertained that in the case of comparative quinacridone pigment 2 of Comparative Example 2, composed of the mixture of two quinacridone pigments, the hue is yellowish, but the vividness by visual observation is clearly inferior to that in the cases of Examples.

[Inkjet Ink]

<Preparation of Magenta Color Aqueous Pigment Dispersion Liquid 1>

A pre-mill base was prepared by blending 200 parts of quinacridone solid solution pigment 1 obtained in Example 1 as a magenta pigment, 200 parts of a pigment dispersant, 30 parts of diethylene glycol monobutyl ether (another name: butyl diglycol, hereinafter, abbreviated as BDG) as a liquid medium, and 340 parts of water, and deflocculating a resultant mixture with a disper. As the dispersant, an aqueous solution (solid content of 30%) of an ammonia-neutralized product of a styrene/2-ethylhexyl acrylate/acrylic acid (mass ratio: 50/30/20) copolymer having a number average molecular weight of 7000 and an acid value of 155 mgKOH/g was used. Subsequently, a dispersion treatment was performed on the obtained pre-mill base using a horizontal type media disperser "DYNO-MILL 0.6 Liter ECM TYPE" (trade name, manufactured by Shinmaru Enterprises Corporation, zirconia bead diameter of 0.3 mm) at a peripheral speed of 7 m/s. The dispersion was completed at the time when the dispersion was performed for 1 hour to obtain a mill base.

The obtained mill base was diluted with ion-exchanged water in such a way that the pigment content was 15%, and a centrifugal separation treatment was subsequently performed to obtain a pigment dispersion liquid containing quinacridone solid solution pigment 1 dispersed therein. Subsequently, the obtained pigment dispersion liquid was subjected to filtration with a 10-μm membrane filter, and ion-exchanged water, an antiseptic, and glycerin were added each in a predetermined amount to obtain magenta color pigment dispersion liquid 1 having a pigment concentration of 12%.

The average particle diameter of magenta color pigment dispersion liquid 1 obtained above was measured (25° C.) with a particle size measuring instrument "NICOMP 380ZLS-S" (manufactured by Particle Sizing Systems, PSS, LLC.) to find that the average particle diameter was 126 nm. In addition, the viscosity was 4.03 mPa·s, the surface tension was 44.0 mN/m, and pH was 9.6. The formulation and results of the physical properties of magenta color pigment dispersion liquid 1 are shown together in Table 2.

<Preparation of Magenta Color Aqueous Pigment Dispersion Liquids 2 to 6>

Magenta color aqueous pigment dispersion liquids 2 to 6 were each obtained in the same manner as in the preparation of the magenta color aqueous pigment dispersion liquid 1, except that quinacridone solid solution pigments 2 to 4, comparative quinacridone solid solution pigment 1, and comparative quinacridone pigment 2, which were obtained in Examples and Comparative Examples, were each used in place of quinacridone solid solution pigment 1 used in the preparation of magenta color aqueous pigment dispersion liquid 1. The formulation and results of the physical properties of pigment dispersion liquids 2 to 6 are shown together in Table 2.

TABLE 2

Formulation and physical properties of magenta color pigment dispersion liquids

| | | Aqueous pigment dispersion liquids | 1 | 2 | 3 | 4 | 5 | 6 |
|---|---|---|---|---|---|---|---|---|
| Pre-mill base | Pigments used | Type | Solid solution pigment 1 | Solid solution pigment 2[2] | Solid solution pigment 3 | Solid solution pigment 4 | Comparative solid solution pigment 1 | Comparative pigment 2 |

TABLE 2-continued

Formulation and physical properties of magenta color pigment dispersion liquids

| Aqueous pigment dispersion liquids | | 1 | 2 | 3 | 4 | 5 | 6 |
|---|---|---|---|---|---|---|---|
| | Solvent for pigmentation | DMSO | DMSO | DMSO | DMSO | DMSO | DMSO |
| | PV19/PR122[1)] | 70/30 | 70/30 | 80/20 | 50/40 | 30/70 | Mixed in 70/30 |
| | Amount used | 200 parts | 200 parts | 200 parts | 200 parts | 200 parts | 200 parts |
| | Amount of dispersant | 200 parts | 200 parts | 200 parts | 200 parts | 200 parts | 200 parts |
| | BDG (in dispersion liquid) | 30 parts | 30 parts | 30 parts | 30 parts | 30 parts | 30 parts |
| | Water | 340 parts | 340 parts | 340 parts | 340 parts | 340 parts | 340 parts |
| *1 | Pigment content (%) | 12 | 12 | 12.4 | 12 | 12.1 | 12 |
| | Average particle diameter (nm) | 126 | 113 | 126 | 113 | 113 | 117 |
| | Viscosity (mPa · s) | 4.03 | 3.58 | 3.83 | 3.58 | 3.58 | 4.06 |
| | Surface tension (mN/m) | 44.0 | 44.4 | 43.9 | 44.4 | 44.9 | 44.4 |
| | pH | 9.6 | 10.1 | 9.7 | 10.1 | 9.9 | 8.6 |

*1: Physical properties of pigment dispersion liquid
[1)]Mass ratio of unsubstituted quinacridone:2,9-dialkylquinacridone
[2)]Quinacridone-based pigment derivative was used together in pigmentation <Preparation of Magenta Color Inkjet Aqueous Pigment Inks 1 to 6>

Next, magenta color aqueous pigment dispersion liquid 1 obtained above was used, 5.0 parts of BDG, 2.5 parts of triethylene glycol monobutyl ether (BTG), 18 parts of glycerin, 1 part of "SURFYNOL 465" (trade name, manufactured by Air Products and Chemicals, Inc.), and water were added to 41.7 parts of aqueous pigment dispersion liquid 1 to adjust the total amount to 100 parts, and a resultant mixture was stirred sufficiently. Thereafter, filtration was performed with a membrane filter having a pore size of 10 µm to remove large pigment particles, and thus magenta color inkjet aqueous pigment ink 1 was obtained.

With respect to the particle diameter of the pigment in the obtained ink, the average particle diameter was measured (25° C.) with the particle size measuring instrument "NICOMP 380ZLS-S" (trade name, manufactured by Particle Sizing Systems, PSS, LLC.) and was found to be 124 nm, and the ink had a viscosity of 3.41 mPa·s and a pH of 9.5. The particle diameter of the pigment in the ink is a value of the average particle diameter based on scattering light intensity measured with the particle size measuring instrument "NICOMP 380ZLS-S". In addition, the viscosity of the ink is a value measured with the particle size measuring instrument "NICOMP 380ZLS-S".

Magenta color inkjet aqueous pigment inks 2 to 6 were prepared by the same method as described above, except that aqueous pigment dispersion liquids 2 to 6 were used in place of aqueous pigment dispersion liquid 1. The physical properties of prepared respective inks are shown together in Table 3.

<Evaluation 2: Evaluation of Pigment Dispersion Liquids and Inks>

1. Evaluation of Dispersion Stability/Storage Stability

The viscosity and particle diameter of magenta color aqueous pigment dispersion liquids 1 to 6 and magenta color inkjet aqueous pigment inks 1 to 6, which were prepared above, were each measured at the initial stage and after they were left to stand at 70° C. for 7 days. The rate (%) of the change in the viscosity and the rate (%) of the change in the particle diameter were each calculated using these measured values, and the dispersion stability/storage stability of the inks were each evaluated according to the criteria described below. It is to be noted that both the rates of the changes were determined from the percentage (%) of (value after 7 days)/(initial value)−1 and were evaluated according to the following criteria. Obtained results are shown in Table 4.

[Evaluation Criteria]
(Change in Particle Diameter)
A: rate of change in particle diameter is less than ±5%
B: rate of change in particle diameter is ±5% or more and less than 10%
C: rate of change in particle diameter is ±10% or more and less than 15%
D: rate of change in particle diameter is ±15% or more
(Change in Viscosity)
A: initial viscosity is low, and rate of change is less than ±10%
B: initial viscosity is high, and rate of change is less than ±10%
C: initial viscosity is low, and rate of change is ±10% or more

TABLE 3

Formulations and physical properties of magenta color pigment inks

| | | Example 1 | Example 2 | Example 3 | Example 4 | Comparative Example 1 | Comparative Example 2 |
|---|---|---|---|---|---|---|---|
| Aqueous pigment ink No. | | 1 | 2 | 3 | 4 | 5 | 6 |
| Pigment dispersion liquid used | | 1 | 2 | 3 | 4 | 5 | 6 |
| Physical properties of ink | Pigment content in ink(%) | 5 | 5 | 5 | 5 | 5 | 5 |
| | Average particle diameter (nm) | 124 | 114 | 124 | 114 | 113 | 116 |
| | Viscosity (mPa · s) | 3.41 | 3.58 | 3.58 | 3.58 | 3.53 | 3.43 |
| | pH | 9.5 | 10.1 | 9.6 | 10.1 | 9.7 | 8.7 |

D: initial viscosity is high, and rate of change is ±10% or more

It is to be noted that those having a viscosity of "4 mPa·s or more" were rated as "viscosity is high" and those having a viscosity of "less than 4 mPa·s" were rated as "viscosity is low".

TABLE 4

Evaluation results of dispersion stability/storage stability of aqueous pigment dispersion liquids

|  | Average particle diameter (nm) | | | | Viscosity (mPa · s) | | | |
| --- | --- | --- | --- | --- | --- | --- | --- | --- |
|  | Initial | After 7 days | Rate of change | Evaluation | Initial | After 7 days | Rate of change | Evaluation |
| Aqueous pigment dispersion liquid 1 (Pigment of Example 1) | 126 | 124 | −1.59% | A | 4.03 | 3.71 | −7.94% | B |
| Aqueous pigment dispersion liquid 2 (Pigment of Example 2) | 113 | 112 | −0.88% | A | 3.58 | 3.48 | −2.79% | A |
| Aqueous pigment dispersion liquid 3 (Pigment of Example 3) | 126 | 125 | −0.79% | A | 3.83 | 3.95 | 3.13% | A |
| Aqueous pigment dispersion liquid 4 (Pigment of Example 4) | 113 | 112 | −0.88% | A | 3.58 | 3.48 | −2.79% | A |
| Aqueous pigment dispersion liquid 5 (Pigment of Comparative Example 1) | 113 | 112 | −0.88% | A | 3.58 | 3.48 | −2.79% | A |
| Aqueous pigment dispersion liquid 6 (Pigment of Comparative Example 2) | 117 | 116 | −0.85% | A | 4.06 | 3.80 | −6.40% | B |

Evaluation results of dispersion stability/storage stability of inkjet inks

|  | Average particle diameter (nm) | | | | Viscosity (mPa · s) | | | |
| --- | --- | --- | --- | --- | --- | --- | --- | --- |
|  | Initial | After 7 days | Rate of change | Evaluation | Initial | After 7 days | Rate of change | Evaluation |
| Aqueous pigment ink 1 (Pigment of Example 1) | 124 | 130 | 4.84% | A | 3.41 | 3.42 | 0.29% | A |
| Aqueous pigment ink 2 (Pigment of Example 2) | 114 | 112 | −1.75% | A | 3.58 | 3.48 | −2.79% | A |
| Aqueous pigment ink 3 (Pigment of Example 3) | 124 | 138 | 11.29% | C | 3.58 | 3.83 | 6.98% | A |
| Aqueous pigment ink 4 (Pigment of Example 4) | 114 | 112 | −1.75% | A | 3.58 | 3.48 | −2.79% | A |
| Aqueous pigment ink 5 (Pigment of Comparative Example 1) | 113 | 114 | 0.88% | A | 3.53 | 3.41 | −3.40% | A |
| Aqueous pigment ink 6 (Pigment of Comparative Example 2) | 116 | 152 | 31.03% | D | 3.43 | 3.85 | 12.24% | C |

(Quality Evaluation of Printed Matter)

Magenta color inkjet aqueous pigment inks 1 to 6 prepared above were each filled in a cartridge and printed on 2 types of paper, (i) dedicated photo glossy paper (PGPP) and (ii) plain paper using an inkjet printer with a photo mode to obtain printed matter. "PM 4000PX" (trade name, manufactured by Seiko Epson Corporation) was used as the inkjet printer. In addition, "Xerox Business 4200 Paper" (trade name, manufactured by Xerox Corporation, US) was used as the plain paper. As a result, it was ascertained that any of the aqueous pigment inks can be ejected from inkjet nozzles without a problem.

The quality of the obtained printed matter was evaluated using a spectrophotometer "i1 Basic Pro" (trade name, manufactured by X-Rite Inc.). Specifically, the chroma C* and the optical density (OD value) were measured with the spectrophotometer under the following conditions and evaluated with respect to the obtained printed matter. The measurement results are shown in Table 5. In addition, the results of visual observation of the tint are shown together. It is to be noted that with respect to the optical density (OD value) and the chroma C*, a larger value can be rated as more excellent in both of them.

[Measurement Conditions]

Optical density (OD value) on plain paper: average value of 6 points each measured 3 times Optical property (chroma C*) on plain paper: average value of 6 points each measured once Optical density (OD value) on dedicated photo glossy paper: average value of 3 points each measured once Optical property (chroma C*) on dedicated photo glossy paper: average value of 3 points each measured once

TABLE 5

| | Average particle diameter of pigment in ink (nm) | Optical properties of printed matter | | | | | |
|---|---|---|---|---|---|---|---|
| | | Plain paper | | | Glossy paper | | |
| | | Chroma C* | Tint | OD value | Chroma C* | Tint | OD value |
| Aqueous pigment ink 1 | 124 | 59.9 | Yellowish | 1.09 | 80.2 | Yellowish | 2.12 |
| Aqueous pigment ink 2 | 114 | 59.8 | Yellowish | 1.09 | 79.8 | Yellowish | 2.11 |
| Aqueous pigment ink 3 | 124 | 59.8 | Yellowish | 1.09 | 79.4 | Yellowish | 2.10 |
| Aqueous pigment ink 4 | 114 | 59.8 | Yellowish | 1.09 | 80 | Yellowish | 2.11 |
| Aqueous pigment ink 5 | 113 | 59.5 | Bluish | 1.12 | 84.1 | Bluish | 2.12 |
| Aqueous pigment ink 6 | 116 | 58.3 | Yellowish | 1.09 | 77.2 | Yellowish | 2.01 |

From the results shown in Table 5, the printed matter obtained by printing with magenta color inkjet aqueous pigment ink 1 to which quinacridone solid solution pigment 1 of Example 1 was applied had more excellent color developability (OD value) and chroma (C*) in both of the cases where magenta color inkjet aqueous pigment ink 1 was printed on the plain paper and on the glossy paper than the printed matter obtained by printing with magenta color inkjet aqueous pigment ink 6 using the mixed pigment of the PV 19 pigment and PR 122 of Comparative Example 2, which was obtained by a conventional production method. In addition, as a result of visual observation of these pieces of printed matter, it was ascertained that the printed matter obtained by printing with aqueous pigment ink 1 clearly has a yellowish hue as compared to the printed matter obtained by printing with aqueous pigment ink 5 of Comparative Example 1. From these facts, it was ascertained that the printed matter which is obtained by applying the quinacridone solid solution pigment obtained by the production method of the present invention, as compared to conventional printed matter, is excellent in color developability of keeping the chroma and printed density at a high level and has an inkjet property of giving an image having a yellowish hue that can fully satisfy the need in the market.

The invention claimed is:

1. A pigment dispersion liquid comprising:
   a quinacridone solid solution pigment of unsubstituted quinacridone and a 2,9-dialkylquinacridone;
   a pigment dispersant; and
   water, wherein
   the quinacridone solid solution pigment has diffraction peaks where values of 2θ in)(2θ±0.2°) expressed using a Bragg angle (θ) are 27.4°, 13.8°, and 5.9° in powder X-ray diffraction, and
   an intensity ratio of the diffraction peak at the 13.8° is 76 and an intensity ratio thereof at the 27.4° is 71, each relative to an intensity of the diffraction peak at the 5.9° as 100.

2. An inkjet ink comprising:
   a quinacridone solid solution pigment comprising a solid solution of unsubstituted quinacridone and a 2,9-dialkylquinacridone, and having a major axis diameter of particles of 20 to 80 nm;
   a piment dispersant; and
   water, wherein
   the quinacridone solid solution pigment has diffraction peaks where values of 2θ in)(2θ±0.2°) expressed using a Bragg angle (θ) are 27.4°, 13.8°, and 5.9° in powder X-ray diffraction, and
   an intensity ratio of the diffraction peak at the 13.8° is 76 and an intensity ratio thereof at the 27.4° is 71, each relative to an intensity of the diffraction peak at the 5.9° as 100.

\* \* \* \* \*